(12) United States Patent
Haronian (10) Patent No.: US 11,959,531 B2
(45) Date of Patent: Apr. 16, 2024

(54) SYSTEM FOR CONVERTING ROTATION TO DISPLACEMENT

(71) Applicant: Michael Haronian, Tzur Hadasa (IL)

(72) Inventor: Michael Haronian, Tzur Hadasa (IL)

( * ) Notice: Subject to any disclaimer, the term of this patent is extended or adjusted under 35 U.S.C. 154(b) by 127 days.

(21) Appl. No.: 17/828,133

(22) Filed: May 31, 2022

(65) Prior Publication Data
US 2023/0383821 A1    Nov. 30, 2023

(51) Int. Cl.
*F16H 21/16*    (2006.01)

(52) U.S. Cl.
CPC .................. *F16H 21/16* (2013.01)

(58) Field of Classification Search
CPC ........... F16H 21/16; F16H 21/30; F16H 21/50
See application file for complete search history.

(56) References Cited

U.S. PATENT DOCUMENTS 4,367,658 A * 1/1983 Rochelt .................. B26B 19/28
74/42

* cited by examiner

*Primary Examiner* — Terence Boes (57) ABSTRACT

A spinning arm that converts a rotational motion of a shaft to a linear movement of an object that includes a revolving piece and a rod. The lower end of the rod is connected to the shaft and the upper end is axially connected to the revolving piece in a state of tilting aside in relation to the rod so that the revolving axis line of the revolving piece crosses the rotation axis line of the rod. The revolving piece can move outwards and roll over the object when its tilt is from right to left. When the revolving piece rolls over the object in a first direction it exerts an upward force that moves the object upward, and when it rolls in a second direction it exerts a downward force that moves the object downward.

15 Claims, 13 Drawing Sheets

SYSTEM FOR CONVERTING ROTATION TO DISPLACEMENT

TECHNICAL FIELD

This disclosure relates to a system that converts rotation movement into a linear movement of an object in contact with the system.

BACKGROUND OF THE INVENTION AND STATE OF THE ART

Figure 1A:
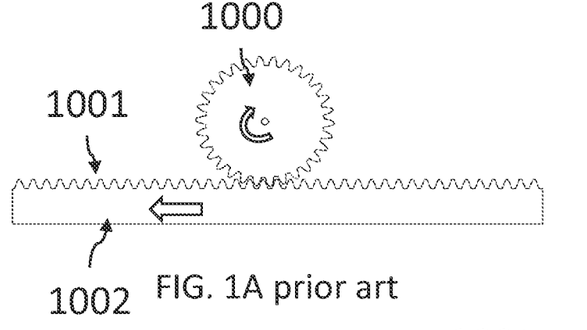
FIGS. 1A-1C depict examples of state of the art rotation to linear movement systems.
Figure 1B:
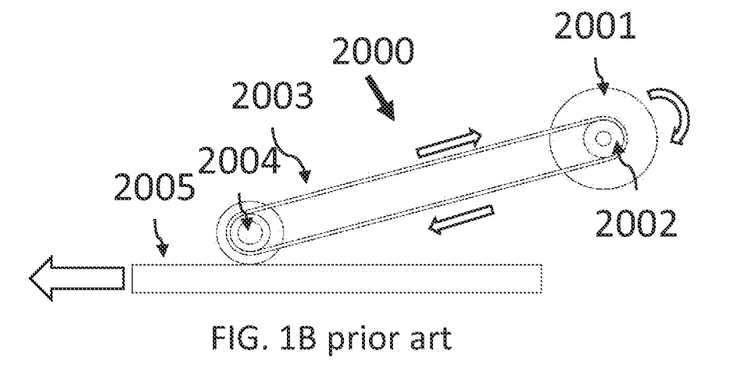
Figure 1C:
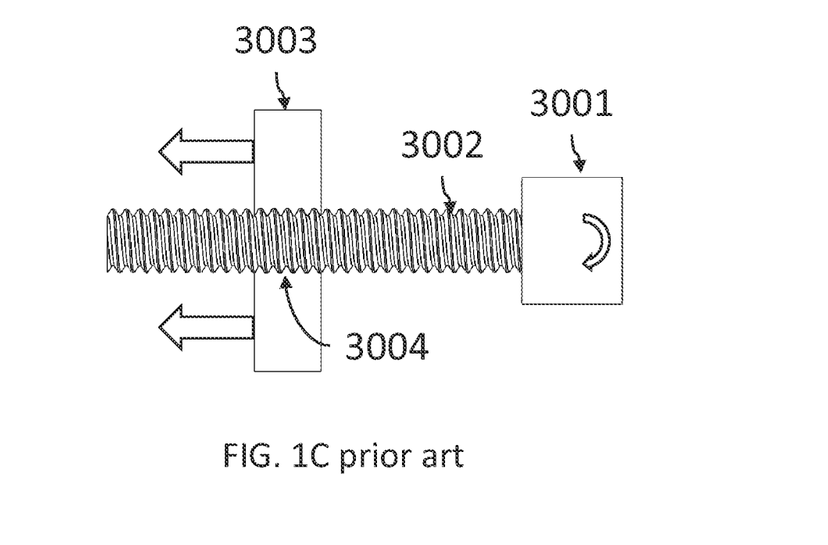

In many cases a rotation movement into a linear movement. FIG. 1 describes three state of the art methods for converting rotation to a linear movement of an object. In FIG. 1a, a gear (1000) and a linear gear (1001) are used to move object (1003) in the X direction. In FIG. 1B, a conveyer belt (2000) comprising a rotation source (2001) two pulleys (2002, 2004), and a belt (2003) is used to move object (2005) in the X direction. In FIG. 1c, a rotation source (3001) connected to a screw (3002) moves object (303) having a nut (304). The moving object (1002) in FIG. 1a is required to be flat. The conveyer belt in FIG. 1B is complex and expensive. The mechanism in FIG. 1c requires a hole and a nut in the movable object. In addition, these examples demonstrate a mechanism that is constantly is connected to the moving object.

For many applications the cost of converting rotation to a linear movement is a major factor. In some applications the linear movement is not required to be accurate. For example, in opening or closing a shatter or opening or closing a telescopic structure. This patent application describes a simple system that uses centrifugal force and friction to convert rotation of a rotation source into a linear movement. The rotation source may be for example an electrical motor, or some non-electrical source such as a wind turbine or even a human limb.

DESCRIPTION OF THE INVENTION

Figure 2A:
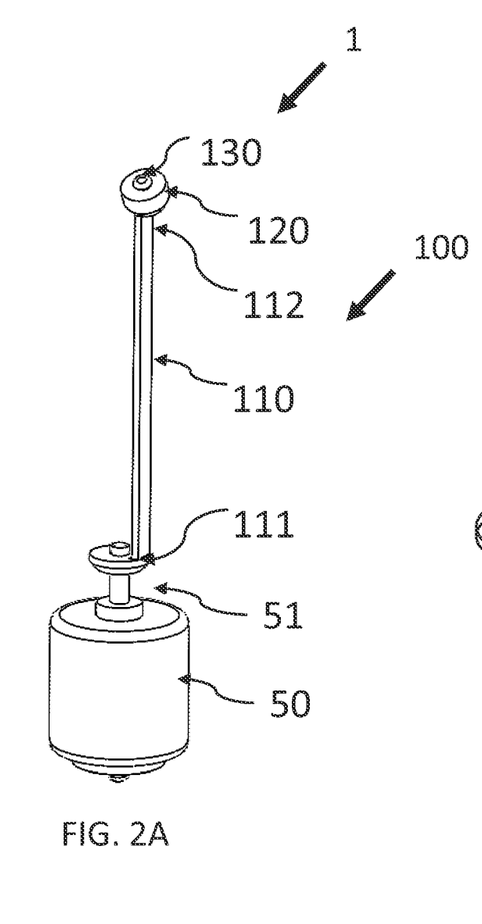
FIG. 2A depicts a system for converting rotation to a linear movement described in this disclosure.
Figure 2B:
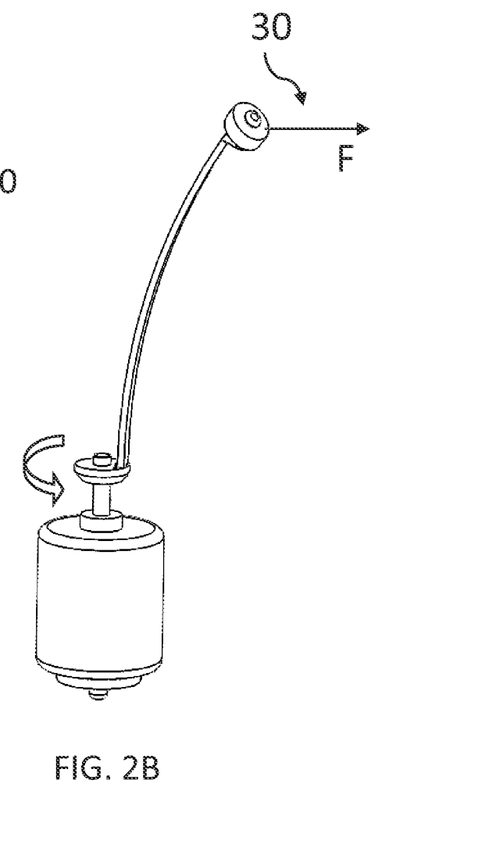
FIG. 2B depicts a system for converting rotation to a linear movement described in this disclosure when rotation source (50) rotates and exerts centrifugal force (30) on the adjustable spinning arm (100).

This disclosure refers to converting rotation into linear movement of objects. FIG. 2a describes schematically a system (1) comprising an adjustable spinning arm (100) comprising a rod (110) connected at its lower end (111) to shaft (51). The upper end (112) of the rod is axially connected to the revolving piece by a hinge (130). The shaft is connected to a rotating source (50) such that when rotated a centrifugal force (30) is applied on the adjustable spinning arm such that the rod bends as schematically demonstrated in FIG. 2b.

Figure 3A:
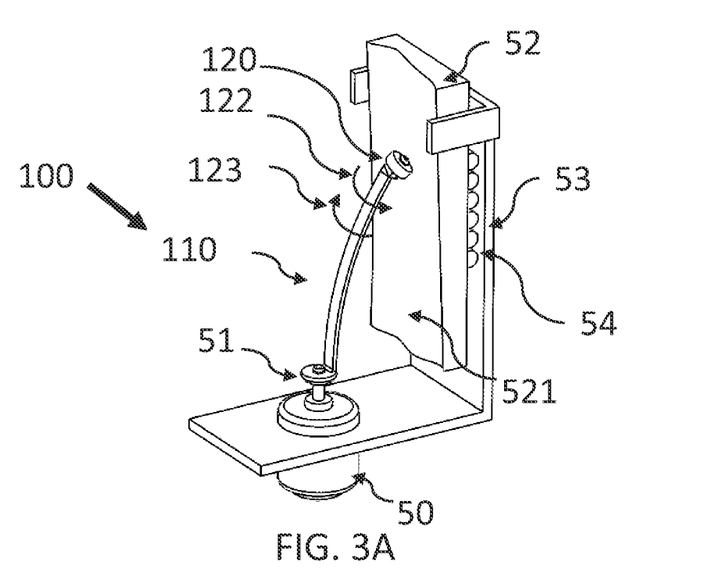
FIG. 3A depicts an embodiment of this disclosure describing the use of the adjustable spinning arm (100) for moving object (52) in the Y direction.
Figure 3B:
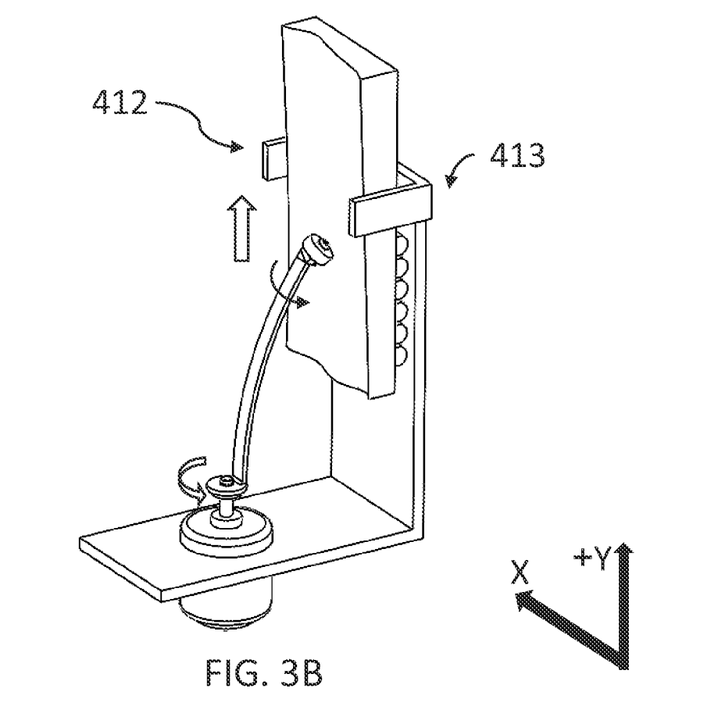
FIG. 3B depicts an embodiment of this disclosure describing the use of the adjustable spinning arm (100) for moving object (52) in the +Y direction.

FIG. 3 describes schematically an embodiment of this patent application. In this embodiment, the device described in FIG. 2 is used to move in the +Y direction object (52) that may have a flat or non-non-flat surface (521). Object (52) is connected to wall (53) through a sliding device (54). The movement of object (52) may be limited to the Y direction by adding stoppers (412, 413). When rotation source (50) rotates, a centrifugal force is developed on the adjustable spinning arm and the revolving piece (120) is pressed against the surface (521) of object (52). The rotation axis of the revolving piece is at angle such that such that the rotation of the revolving piece pushes object (52) in the Y and X directions. The contact between the rotating element and the surface (521) is maintained even if surface (521) is not uniform as demonstrated in FIG. 3. When the rotation rate of rotating source is reduced below a predesigned rate, the centrifugal force becomes small enough to a point when there is no contact between the rolling arm and the object. Object (52) may move in the +Y when the rotation of the rotating source is in one direction (122) and in the —Y direction when the rotation of the rotating source is in the opposite direction (123).

Figure 4:
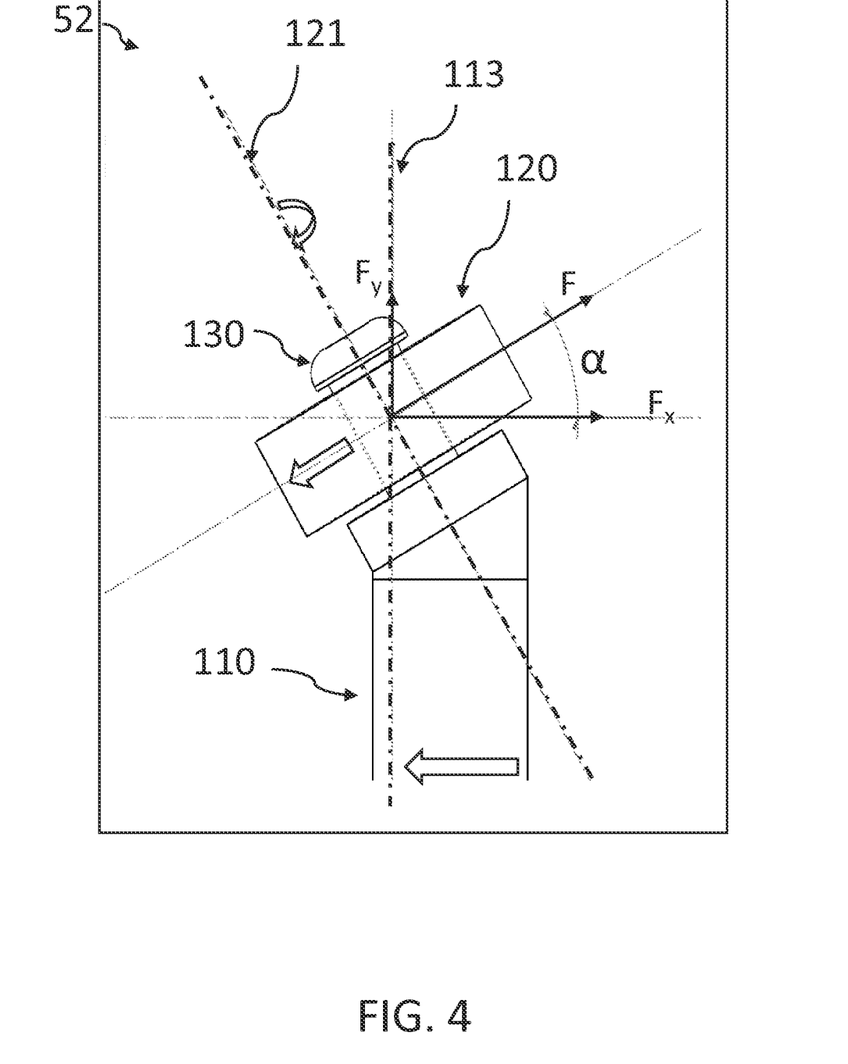
FIG. 4 depicts details of the upper part of the adjustable spinning arm showing the revolving piece (120) and the angel between the revolving piece and the rod (110).
Figure 5:
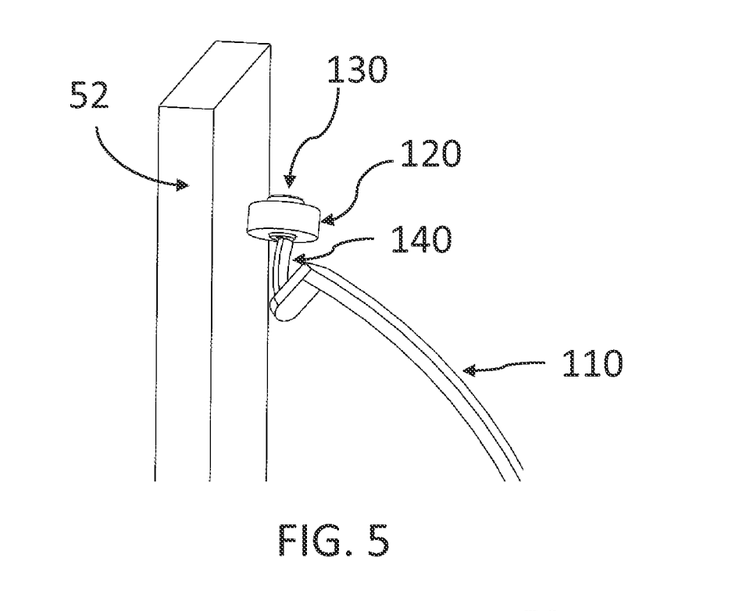
FIG. 5 depicts another embodiment of this disclosure showing the upper part of the adjustable spinning arm were the revolving piece (120) revolves around hinge (130) that is connected to rod (110) through a flexible arm (140).
Figure 6:
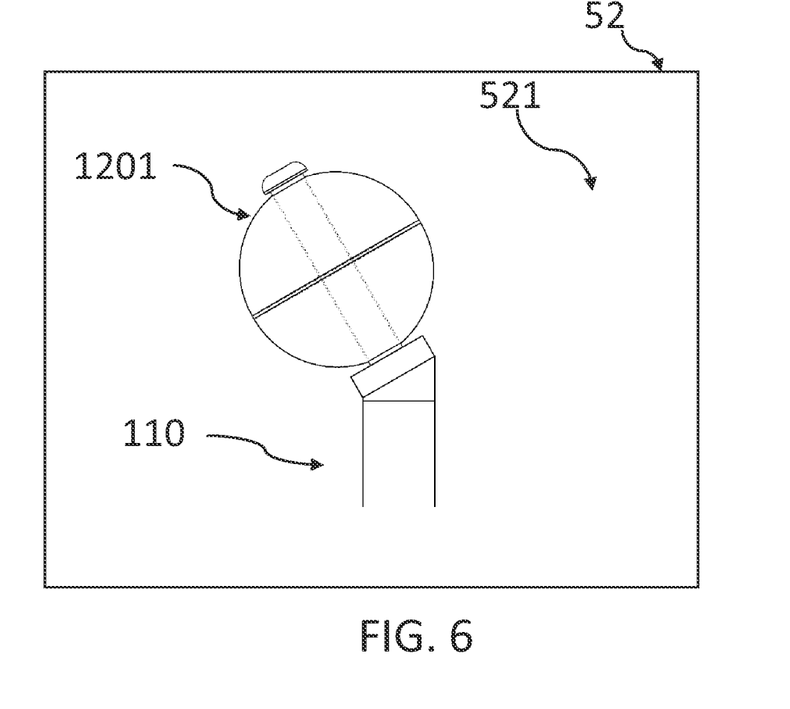
FIG. 6 depicts another embodiment of this disclosure showing the upper part of the adjustable spinning arm where revolving piece has a ball shape (1201).

FIG. 4 describes in detail the contact of revolving piece (120) with object (52). The revolving piece is connected to the rod (110) in a way that the revolving piece is tilted to a side in relation to the rod such that an angle (a) between a revolving axis (121) of the revolving piece and a rotation axis (113) of the rod is less or more than one hundred and eighty degrees. The force F applied by the rod (110) on the object may be divided into Fx and Fy that may induce movements of the object in the X and Y direction respectively. The specific magnitude of the forces Fx and Fy depends on the angle □ that may be determined by specific applications. FIG. 5 describes another embodiment of the device such that the hinge (130) to which the revolving piece (120) is fixed to has a flexible extension (140) such that the contact with the object (52) is optimized. FIG. 6 describes a ball shaped revolving piece (1201) allowing optimal contact with the object independently of the distance between the rod (110) and the object (52), and independently of the shape of the surface (521).

Figure 7A:
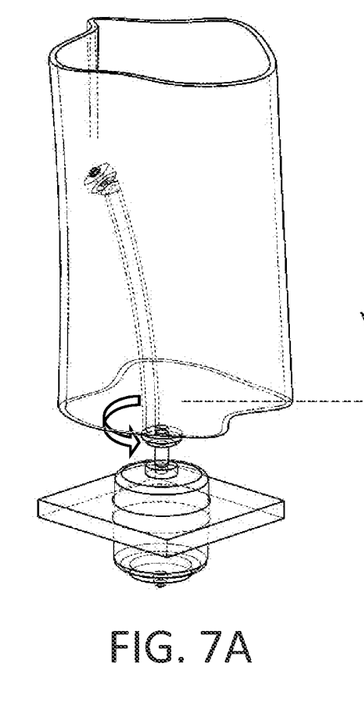
FIG. 7A depicts another embodiment of this disclosure showing the system descried in FIG. 2 when used to move in the Y direction a cylindrical object (52) with a no-uniform surface.
Figure 7B:
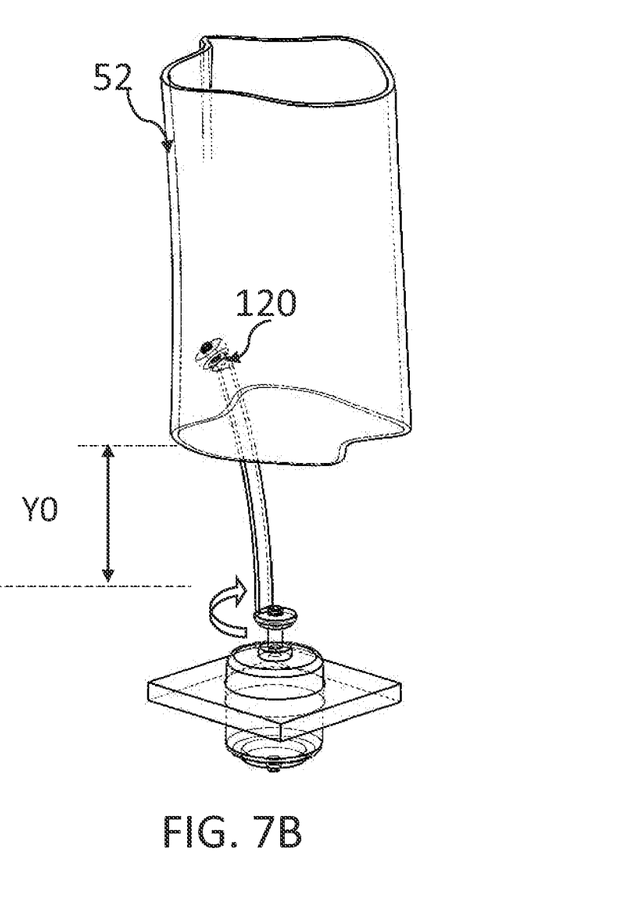
FIG. 7B depicts the object (52) of FIG. 7a after traveling a distance Y0.
Figure 8A:
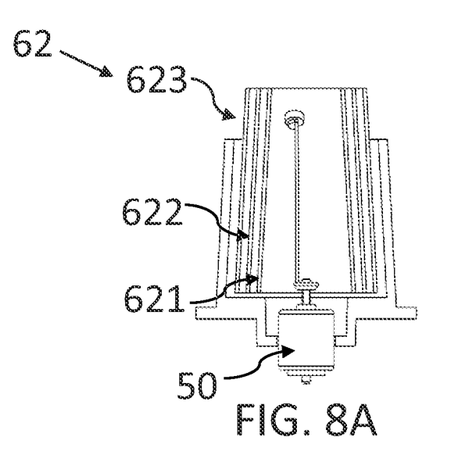
FIGS. 8A-8E depict another embodiment of this disclosure showing the system descried in FIG. 2 when used to unfold a telescopic object (62).
Figure 8B:
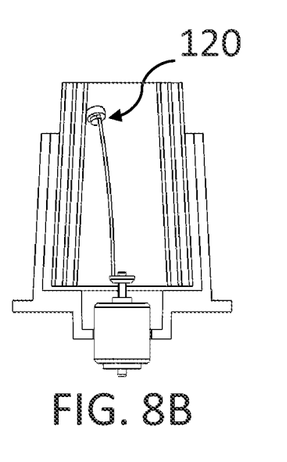
Figure 8C:
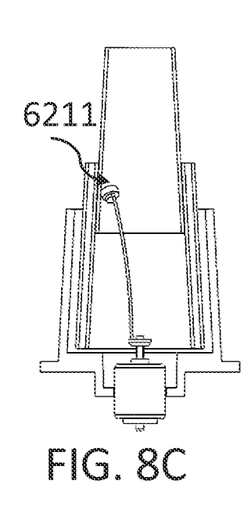
Figure 8D:
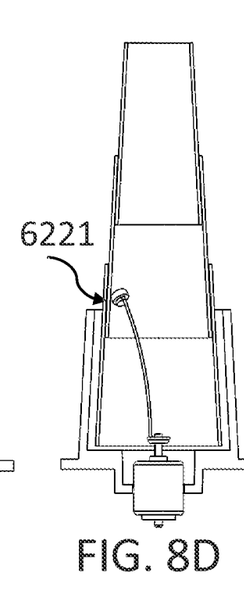
Figure 8E:
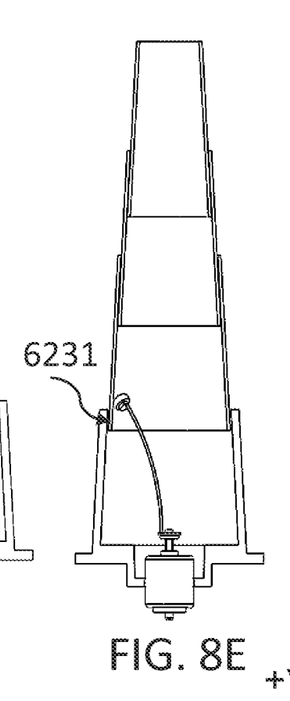

FIG. 7 describes schematically another embodiment of this patent application. In this embodiment, the device described in FIG. 2 is used to move in the +Y direction a cylindrical object (52) that may be symmetrical or non-symmetrical around the Y axis. The revolving piece (120) is pressed against the object by the centrifugal force such that the movement in the +Y direction is maintained even if the contacting surface is not uniform. FIG. 7b shows the object (51) after moving a distance of Y0 in the +Y direction relative to the position described in FIG. 7a. In the embodiment described in FIG. 7 no limitation is used to prevent rotation of the object and therefore object (50) will also rotate as it moves in the +Y direction.

Figure 9:
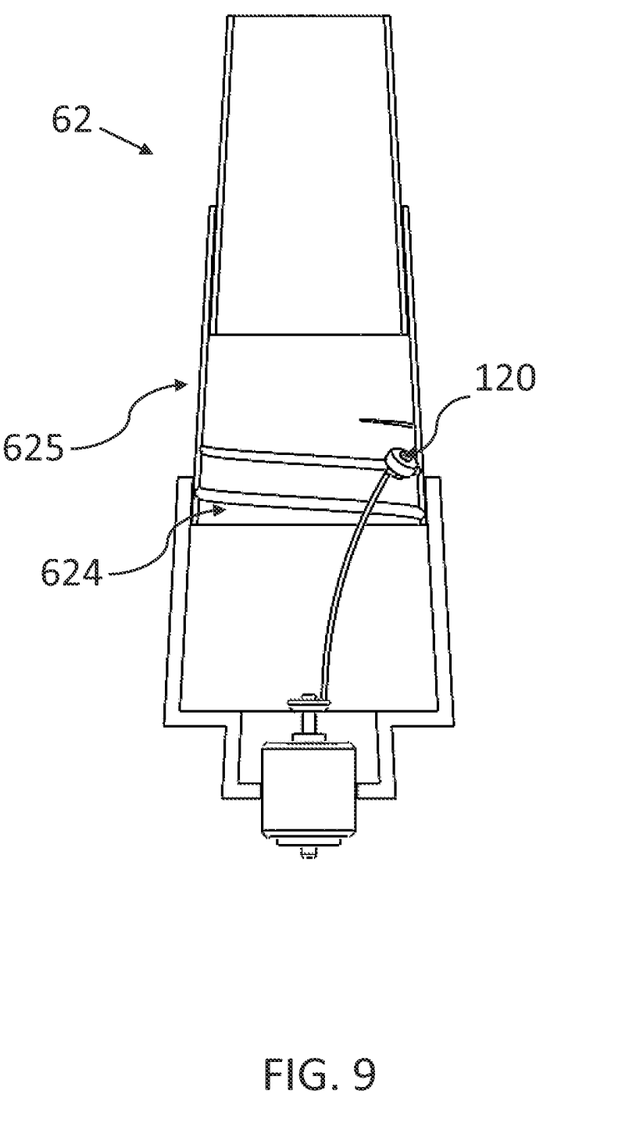
FIG. 9 depicts an embodiment described in FIG. 8 with grooves for aiding the unfolding of the telescopic object.

FIG. 8 describes schematically another embodiment of this patent application. In this embodiment, the device described in FIG. 2 is used to open and close a telescopic device (62). The telescopic device comprises 3 parts (621), (622), and (623). In FIG. 8a the power source (50) is in idle. In FIG. 8b, the power source start to rotate and a centrifugal force pushes the revolving piece (120) and press it against part (621). As the revolving piece rotates, part (621) is forced to move in the +Y as described in FIG. 8c until it reaches stop (6211). As the revolving piece continue to rotate it pushes part (622) in the +Y direction until part (622) reaches stop (6221) as described in FIG. 8d. Next part (623) is pushed in the +Y direction until it stops by stop (6231). The stops (6211), (6221) and (62311) may include some temporary adhering mechanism that holds two adjacent parts together such friction. FIG. 9 describes the object in FIG. 10 with an addition of grooves (624) for assisting the movement in the +Y direction of part (625). It is clear that such grooves may be added to any telescopic part.

Figure 10:
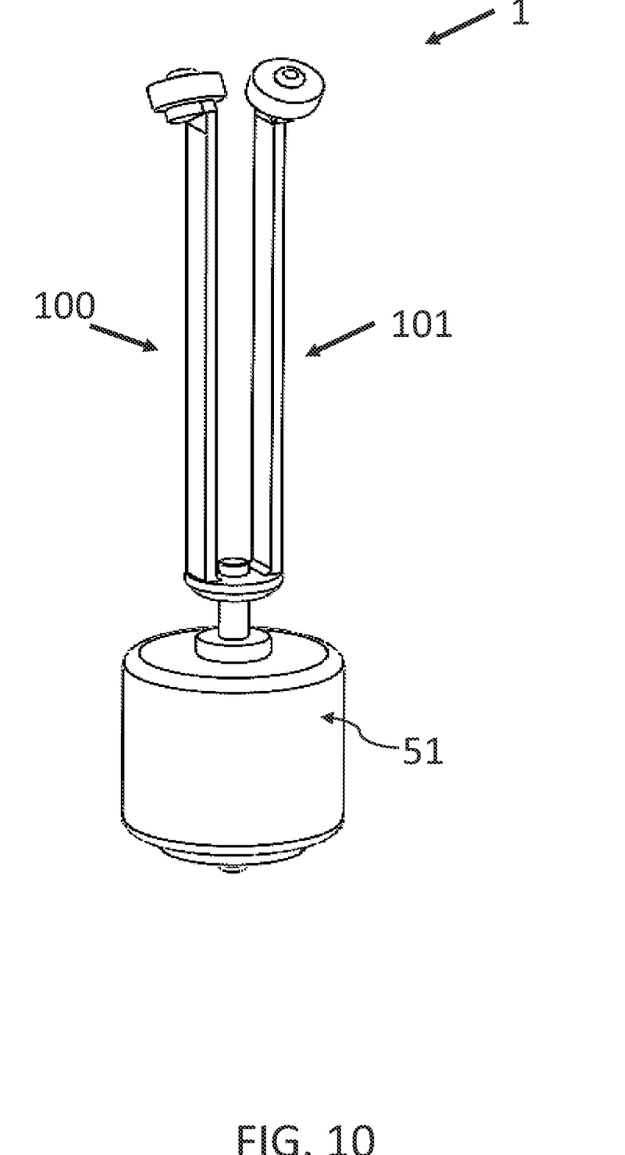
FIG. 10 depicts another embodiment of this patent application showing a system for converting rotation to a linear movement described in this patent application with two adjustable spinning arms (100), (101).
Figure 11:
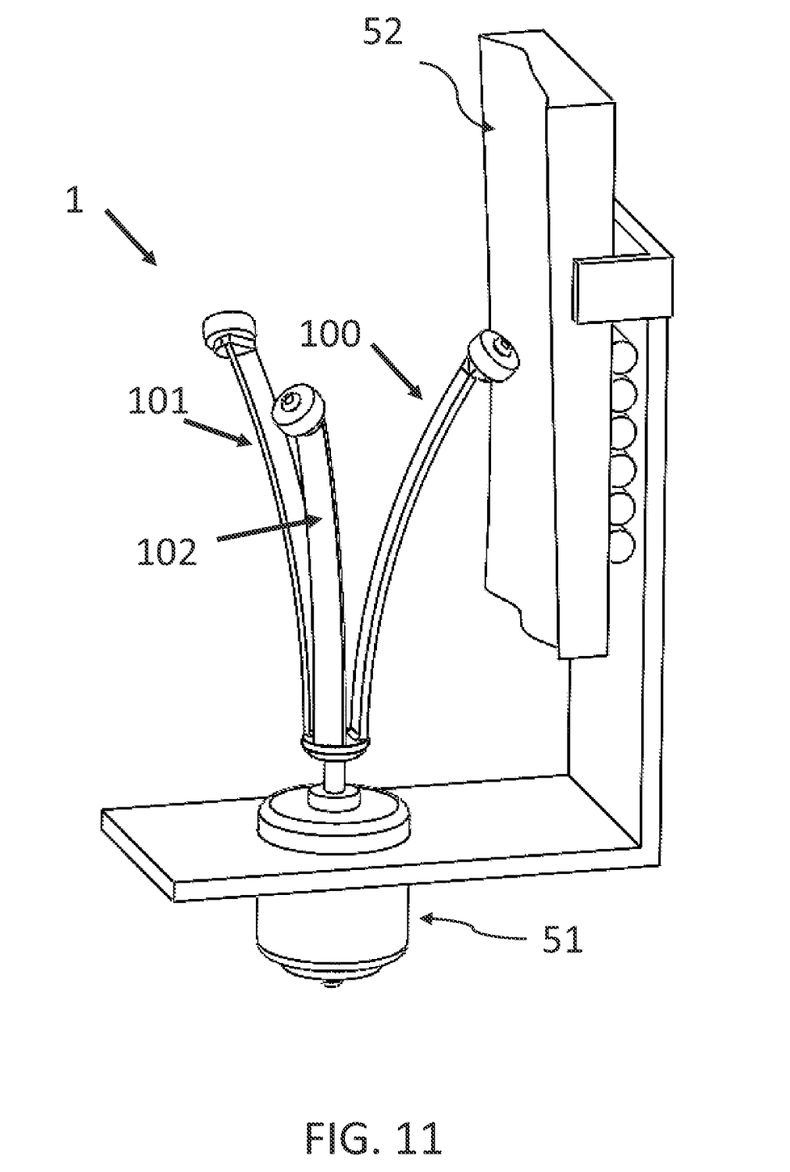
FIG. 11 depicts an embodiment of this disclosure describing the use of three adjustable spinning arms (100), (101) and (102) for moving object (52) in the Y direction.
Figure 12:
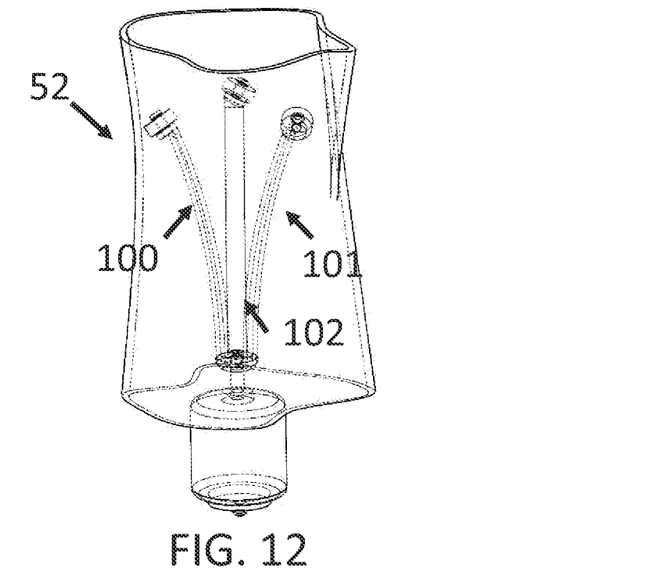
FIG. 12 depicts another embodiment of this disclosure showing a system with three adjustable arms (100), (101), and (102) when used to move in the Y direction a cylindrical object (52) with a no-uniform surface.
Figure 13:
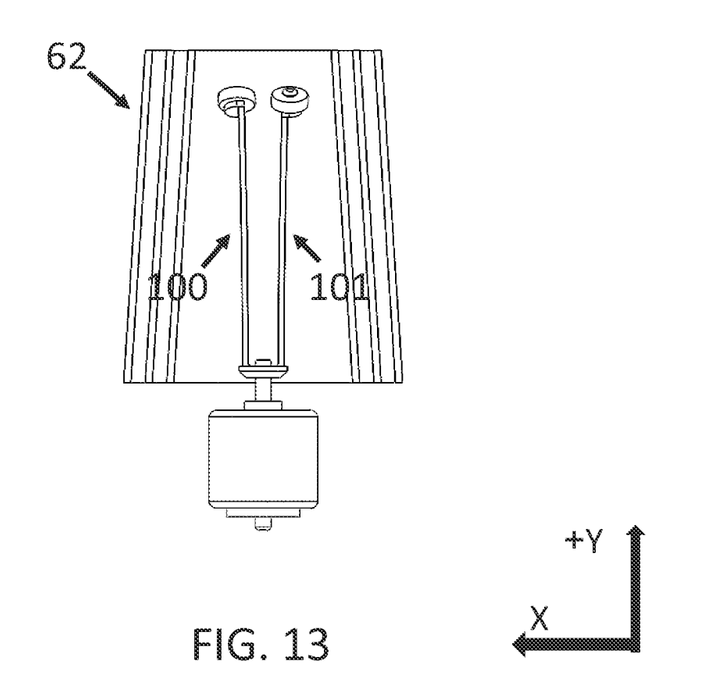
FIG. 13 depicts another embodiment of this disclosure showing a system with two adjustable arms (100) and (101), when used to unfold a telescopic object (62).

FIG. 10 describes an embodiment of this patent application such that the device (1) comprises adjustable spinning arms (100) and (101) and FIG. 11 describes a device (1) with three adjustable spinning arm (100), (101), (102), and (103) that offers more stable and faster movement of object (52) in the Y direction. FIG. 12 describes schematically the same embodiment that is described in FIG. 7 but with three adjustable spinning arms (100), (101) and (102). FIG. 13 describes schematically the same embodiment that is described in FIG. 8 but with two adjustable spinning arms (100) and (101). It is clear that any number of adjustable spinning arms may be used.

Figure 14:
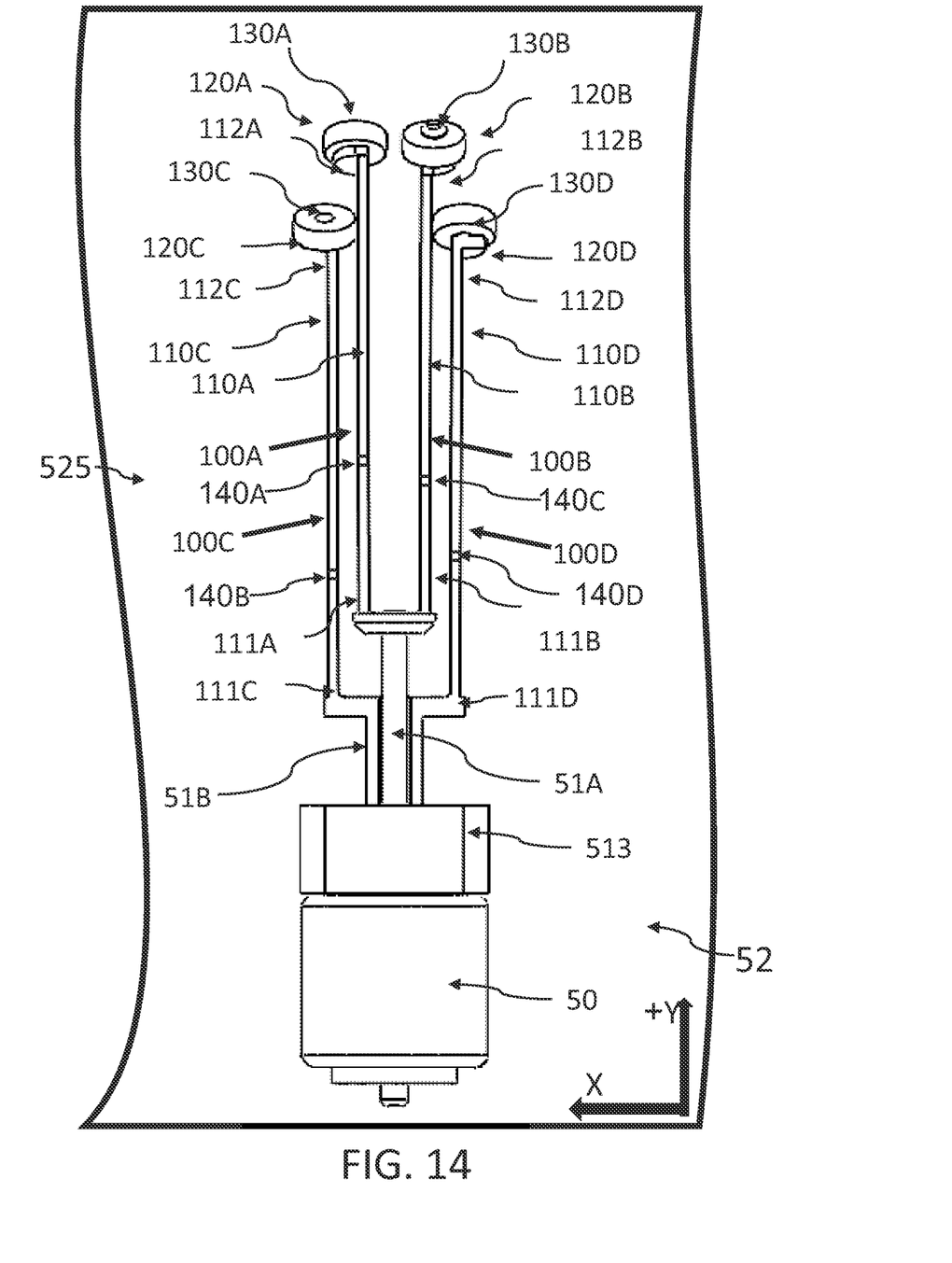
FIG. 14 depicts another embodiment of this disclosure showing a system with inner sets of adjustable arms (100A), (100B), and outer sets of adjustable arms (100C), (100D) such that the rotating source (50) rotates shafts (51A) and (52B) through gear (513), such that the inner set rotates in the opposite direction of the outer set.
Figure 15:
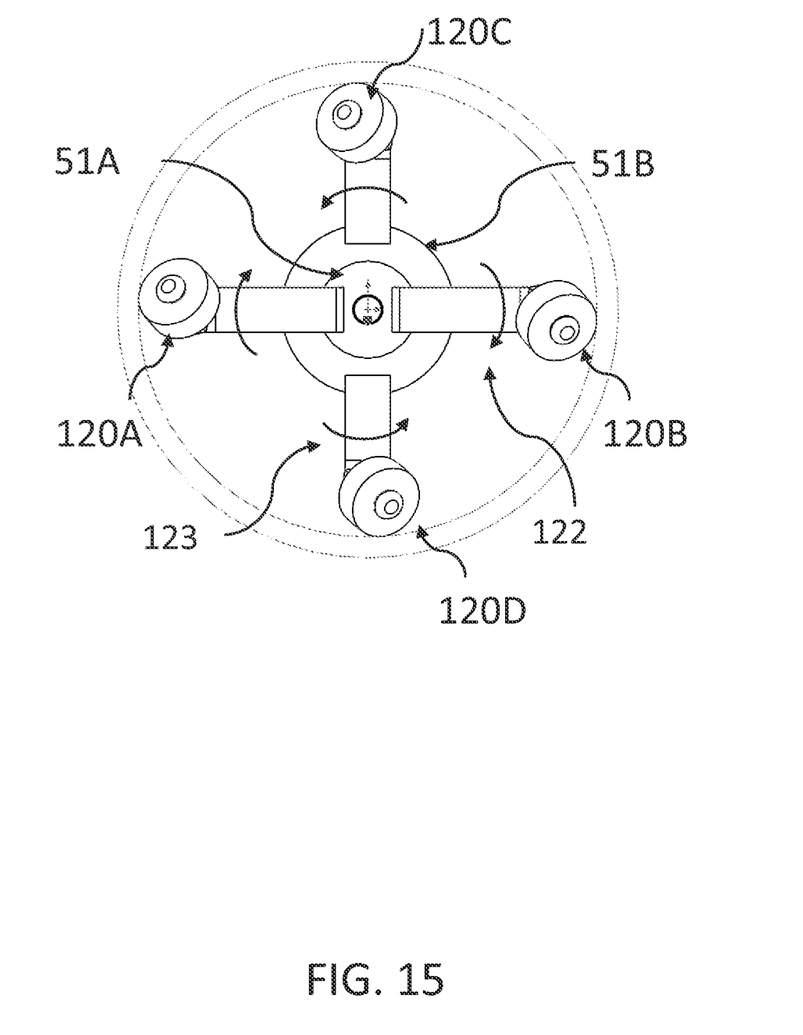
FIG. 15 depicts an upper view of the system described in FIG. 12.

FIG. 14 describes schematically another embodiment of this patent application. Two adjustable spinning arm (100A) and (100B) are connected to shaft (51A) at their lower side (111A) and (111B), and two adjustable spinning arms (100C) and (100D) are connected to shaft (51B) are connected to shaft (51B) at their lower side (111C) and (111D). The upper side of the adjustable spinning arms (110A) is connected in the upper side to revolving pieces (120A) through hinges (130A) such that revolving pieces (120A) is free to rotate around hinges (130A). The upper side of the adjustable spinning arms (110B) is connected in the upper side to revolving pieces (120B) through hinges (130B) such that revolving pieces (120B) is free to rotate around hinges (130B). The upper side of the adjustable spinning arms (110C) is connected in the upper side to revolving pieces (120C) through hinges (130C) such that revolving pieces (120C) is free to rotate around hinges (130C). The upper side of the adjustable spinning arms (110D) is connected in the upper side to revolving pieces (120D) through hinges (130D) such that revolving pieces (120D) is free to rotate around hinges (130D). The power source (50) is connected to the shafts (51A) and (51B) through a gear box (513) such that when the power source rotates, it rotates shaft (51A) in opposite direction to the rotation direction of shaft (51B). The revolving pieces (120A) and (120B) are tilted in opposite direction to the tilting of revolving pieces (120C) and (120D), as described in FIG. 14, such that when the power source rotates all four revolving pieces moves the object (52) in the same Y direction but cancel each other's forces in the X direction such that object (52) doesn't move in the x direction. FIG. 15 describes schematically a top view of the embodiment described in FIG. 14. showing shafts (51A) (51B) and the rotation direction and tilt of revolving pieces (120A) and (120B) relative to pieces (120C) and (120D).

In summary, the present invention discloses an adjustable spinning arm (100) for converting a rotational motion of a rotational shaft (51) to a linear movement of a targeted object (52) that includes a revolving piece (120) and a rod (110). The lower end (111) of the rod is connected to the rotational shaft and the upper end (112) of the rod is axially connected to the revolving piece by a hinge (130). The revolving piece is connected to the rod in a way that it is in a state of tilting aside in relation to the rod such that the revolving axis line (121) of the revolving piece crosses the rotation axis line (113) of the rod. The rotational shaft is designed to be connected to and to be rotated by a power source (50) so that the rotational shaft can rotate the rod around its rotation axis. The revolving piece is capable to move outwards and is designed to roll over and in contact with the targeted object when the tilt of the revolving piece is from right to left with respect to the contact plane on the targeted object. When the revolving piece rolls along and in contact with the targeted object in a first direction (122) the revolving piece can exert upward force on it so that the targeted object can move upward, and when the revolving piece rolls over and in contact with the targeted object in a second direction (123) the revolving piece can exert downward force on it so that the targeted object can move downward.

The present invention also discloses a system (1) for converting a rotational motion to a linear movement that includes the rotational shaft (51), the power source (50), the targeted object (52), and the adjustable spinning arm (100) as defined above.

It is possible that the rod will connected to the rotational shaft by of a spring (140) or that the rod will be made of a flexible material, so that when the rod rotates then its upper end with the revolving piece tends outwards due to the centrifugal force (30) until it tightens to the targeted object and rolls over and in contact with the targeted object and causes it to move upwards or downwards. The targeted object can be connected to a support (53) by a rail (54) to enable it to move upwards and downwards and to be connected also by stoppers (412) (413) that restrict a movement of the targeted object to the sides. In another embodiment, the targeted object is kind of a telescopic device (62) that includes at least a first part (621) and a second part (622) when the first part is assembled inside the second part in such a way that when the first part moves upwards and reach to a certain point (6211) both the first part and the second part are designed to be integrated together and to move upwards to an opened state of the telescopic device.

The revolving piece is capable to move outwards and to roll over and in contact with the targeted object by centrifugal force that the rotations of the rod exerts on the revolving piece as explained above or to move outwards by force of other means and mechanisms such as rubbers, springs, magnets, shafts with activators and the like.

The present invention also discloses a system (1) for converting a rotational motion to a linear movement that includes an inner rotational shaft (51A), an outer rotational shaft (51B), a power source (50) that is capable to rotate the rotational shafts, a targeted object (52), a first inner adjustable spinning arm (100A) that comprises a first revolving piece (120A), and a first rod (110A) that its lower end (111A) is connected to the inner rotational shaft and its upper end (112A) is axially connected by a first hinge (130A) to the first revolving piece, a second inner adjustable spinning arm (100B) that comprises a second revolving piece (120B), and a second rod (110B) that its lower end (111B) is connected to the inner rotational shaft and its upper end (112B) is axially connected by a second hinge (130B) to the second revolving piece, a third outer adjustable spinning arm (100C) that comprises a third revolving piece (120C), and a third rod (110C) that its lower end (111C) is connected to the outer rotational shaft and its upper end (112C) is axially connected by a third hinge (130C) to the third revolving piece, and a fourth outer adjustable spinning arm (100D) that comprises a fourth revolving piece (120D), and a fourth rod (110D) that its lower end (111D) is connected to the outer rotational shaft and its upper end (112D) is axially connected by a fourth hinge (130D) to the fourth revolving piece. The inner and outer adjustable spinning arms are designed to convert the rotational motion of the inner and outer shafts to a linear movement of the targeted object.

The first revolving piece is connected to the first rod in a way that the first revolving piece is in a state of tilting aside in relation to the first rod such that a first revolving axis line (121A) of the first revolving piece crosses a first rotation axis line (113A) of the first rod, the second revolving piece is connected to the second rod in a way that the second revolving piece is in a state of tilting aside in relation to the second rod such that a second revolving axis line (121B) of the second revolving piece crosses a second rotation axis line (113B) of the second rod, the third revolving piece is connected to the third rod in a way that the third revolving piece is in a state of tilting aside in relation to the third rod such that a third revolving axis line (121C) of the third revolving piece crosses a third rotation axis line (113C) of the third rod, and the fourth revolving piece is connected to the fourth rod in a way that the fourth revolving piece is in a state of tilting aside in relation to the fourth rod such that a fourth revolving axis line (121D) of the fourth revolving piece crosses a fourth rotation axis line (113D) of the fourth rod.

The rotational shafts are designed to be connected to and to be rotated by the power source so that the rotational shafts can rotate the rods around their rotation axis. The revolving pieces are capable to move outwards and are designed to roll over and in contact with the targeted object when the tilts of the revolving pieces, all at same direction, are from right to left with respect to a contact plane (525) on the targeted object.

The power source is designed to rotate the inner rotational shaft to clockwise and at the same time to rotate the outer rotational shaft to counterclockwise.

When the first and second revolving pieces rolls over and in contact with the targeted object clockwise and the third and fourth revolving pieces rolls over and in contact with the targeted object counterclockwise the revolving pieces can exert upward force on the targeted object so that the targeted object can move upward and a clockwise horizontal force that the first and second revolving pieces can exert on the targeted object can be negated by a counterclockwise horizontal force that the third and fourth revolving pieces can exert on the targeted object.

For the specification: Dan, think maybe we need the following texts in the specification as an extra explanation: wherein the revolving piece is connected to the rod in a way that the revolving piece is tilted to a side in relation to the rod such that an angle (α) between a revolving axis (121) of the revolving piece and a rotation axis (113) of the rod is less or more than one hundred and eighty degrees;

The first and the second rods can be connected to the inner rotational shaft by first and second springs (140A) (140B), the third and fourth rods can be connected to the outer rotational shaft by third and fourth springs (140C) (140D), or that all the rods can be made of a flexible material.

As explained above the targeted object can be connected to a support (53) by a rail (54) that enables the targeted object to move upwards and downwards and by stoppers that restrict a movement of the targeted object to the sides, the targeted object can be of a kind of the telescopic device (62), and that the revolving pieces are capable to move outwards and to roll over and in contact with the targeted object by the centrifugal force or by other means as explained above.

What is claimed is:

1. An adjustable spinning arm for converting a rotational motion of a rotational shaft to a linear movement of a targeted object that comprises a revolving piece and a rod;

wherein a lower end of the rod is connected to the rotational shaft, and an upper end of the rod is axially connected to the revolving piece by a bearing;

wherein the revolving piece is connected to the rod in a way that the revolving piece is in a state of tilting aside in relation to the rod such that a revolving axis line of the revolving piece crosses a rotation axis line of the rod;

wherein the rotational shaft is designed to be connected to and to be rotated by a power source so that the rotational shaft can rotate the rod around its rotation axis; wherein the revolving piece is capable to move outwards and is designed to roll over and be in contact with the targeted object when the tilt of the revolving piece is from right to left with respect to a contact plane on the targeted object;

wherein when the revolving piece rolls over and be in contact with the targeted object in a first direction the revolving piece can exert upward force on it so that the targeted object can move upward, and when the revolving piece rolls over and be in contact with the targeted object in a second direction the revolving piece can exert downward force on it so that the targeted object can move downward.

2. The adjustable spinning arm according to claim 1, wherein said rod is connected to said rotational shaft by of a spring or wherein the rod is made of a flexible material.

3. The adjustable spinning arm according to claim 1, wherein said targeted object is connected to a support by a rail that enable the targeted object to move upwards and downwards and by stoppers that can restrict a movement of the targeted object to sides.

4. The adjustable spinning arm according to claim 1, wherein said targeted object is a telescopic device that includes at least a first part and a second part; wherein the first part is assembled inside the second part in such a way that when the first part moves upwards and reach to a certain point both the first part and the second part are designed to be integrated together and to move upwards to an opened state of the telescopic device.

5. The adjustable spinning arm according to claim 1, wherein said revolving piece is capable of moving outwards and to be in contact with the targeted object by centrifugal force that said rotations of said rod can exert a force on the revolving piece.

6. A system for converting a rotational motion to a linear movement that comprises a rotational shaft, a power, source that is capable of rotating the rotational shaft, a targeted object, and an adjustable spinning arm that comprises a revolving piece and a rod;
   wherein the adjustable spinning arm is designed to convert a rotational motion of the shaft to a linear movement of the targeted object;
   wherein a lower end of the rod is connected to the shaft, and an upper end of the rod is axially connected to the revolving piece by a bearing;
   wherein the revolving piece is connected to the rod in a way that the revolving piece is in a state of tilting aside in relation to the rod such that a revolving axis line of the revolving piece crosses a rotation axis line of the rod;
   wherein the rotational shaft is designed to be connected to and to be rotated by the power source so that the rotational shaft can rotate the rod around its rotation axis; wherein the revolving piece is capable to move outwards and is designed to move outwards when the rod rotates so that the revolving piece can roll over and be in contact with the targeted object when the tilt of the revolving piece is from right to left with respect to a contact plane on the targeted object;
   wherein when the revolving piece rolls along and is in contact with the targeted object in a first direction the revolving piece can exert upward force on it so that the targeted object can move upward, and when the revolving piece rolls along and is in contact with the targeted object in a second direction the revolving piece can exert downward force on it so that the targeted object can move downward.

7. The system according to claim 6, wherein said rod is connected to said rotational shaft by a spring or wherein the rod is made of a flexible material.

8. The system according to claim 6, wherein said targeted object is connected to a support by a rail that enables the targeted object to move upwards and downwards and by stoppers that can restrict a movement of the targeted object to sides.

9. The system according to claim 6, wherein said targeted object is a telescopic device that includes at least a first part and a second part; wherein the first part is assembled inside the second part in such a way that when the first part moves upwards and reach to a certain point both the first part and the second part are designed to be integrated together and to move upwards to an opened state of the telescopic device.

10. The adjustable spinning arm according to claim 6, wherein said revolving piece is capable of moving outwards and to be in contact with the targeted object by centrifugal force that said rotations of said rod can exert a force on the revolving piece.

11. A system for converting a rotational motion to a linear movement, comprising:
   an inner rotational shaft,
   an outer rotational shaft,
   a power source that is capable to rotate said rotational shafts,
   a targeted object,
   a first inner adjustable spinning arm that comprises a first revolving piece, and a first rod that its lower end is connected to the inner rotational shaft and its upper end is axially connected by a first bearing to the first revolving piece;
   a second inner adjustable spinning arm that comprises a second revolving piece, and a second rod that its lower end is connected to the inner rotational shaft and its upper end is axially connected by a second bearing to the second revolving piece;
   a third outer adjustable spinning arm that comprises a third revolving piece, and a third rod that its lower end is connected to the outer rotational shaft and its upper end is axially connected by a third hinge bearing to the third revolving piece;
   a fourth outer adjustable spinning arm that comprises a fourth revolving piece, and a fourth rod that its lower end is connected to the outer rotational shaft and its upper end is axially connected by a fourth bearing to the fourth revolving piece;
   wherein said inner and outer adjustable spinning arms are designed to convert a rotational motion of the inner and outer shafts to a linear movement of the targeted object;
   wherein the first revolving piece is connected to the first rod in a way that the first revolving piece is in a state of tilting aside in relation to the first rod such that a first revolving axis line of the first revolving piece crosses a first rotation axis line of the first rod;
   wherein the second revolving piece is connected to the second rod in a way that the second revolving piece is in a state of tilting aside in relation to the second rod such that a second revolving axis line of the second revolving piece crosses a second rotation axis line of the second rod;
   wherein the third revolving piece is connected to the third rod in a way that the third revolving piece is in a state of tilting aside in relation to the third rod such that a third revolving axis line of the third revolving piece crosses a third rotation axis line of the third rod;
   wherein the fourth revolving piece is connected to the fourth rod in a way that the fourth revolving piece is in a state of tilting aside in relation to the fourth rod such that a fourth revolving axis line of the fourth revolving piece crosses a fourth rotation axis line of the fourth rod;
   wherein said rotational shafts are designed to be connected to and to be rotated by the power source so that the rotational shafts can rotate said rods around their rotation axis; wherein said revolving pieces are capable of moving outwards and are designed to roll over and be in contact with the targeted object when the tilts of said revolving pieces are from right to left with respect to a contact plane on the targeted object;

wherein the power source is designed to rotate the inner rotational shaft to clockwise and at the same time to rotate the outer rotational shaft to counterclockwise;

wherein when the first and second revolving pieces rolls over and in contact with the targeted object clockwise and the third and fourth revolving pieces rolls over clockwise and are in contact with the targeted object and the third and fourth revolving pieces rolls over counterclockwise and in contact with the targeted piece said revolving pieces can exert upward force on the targeted object so that the targeted object can move upward, and a clockwise horizontal force that the first and second revolving pieces can exert on the targeted object can be negated by a counterclockwise horizontal force that the third and fourth revolving pieces can exert on the targeted object.

12. The system according to claim 11, wherein said first and second rods are connected to said inner rotational shaft by a first and second springs, said third and fourth rods are connected to said outer rotational shaft by a third and fourth springs, or wherein said rods are made of a flexible material.

13. The system according to claim 11, wherein said targeted object is connected to a support by a rail that enables the targeted object to move upwards and downwards and by stoppers that can restrict a movement of the targeted object to sides.

14. The system according to claim 11, wherein said targeted object is a telescopic device that includes at least a first part and a second part; wherein the first part is assembled inside the second part in such a way that when the first part moves upwards and reach to a certain point both the first part and the second part are designed to be integrated together and to move upwards to an opened state of the telescopic device.

15. The adjustable spinning arm according to claim 11, wherein said revolving pieces are capable of moving outwards and to be in contact with the targeted object by centrifugal force that said rotations of said rods can exert a force on the revolving pieces.

* * * * *